March 24, 1931. W. W. CONSTANTINE 1,797,329
BRAKE OPERATING MECHANISM
Filed March 23, 1929 2 Sheets-Sheet 2

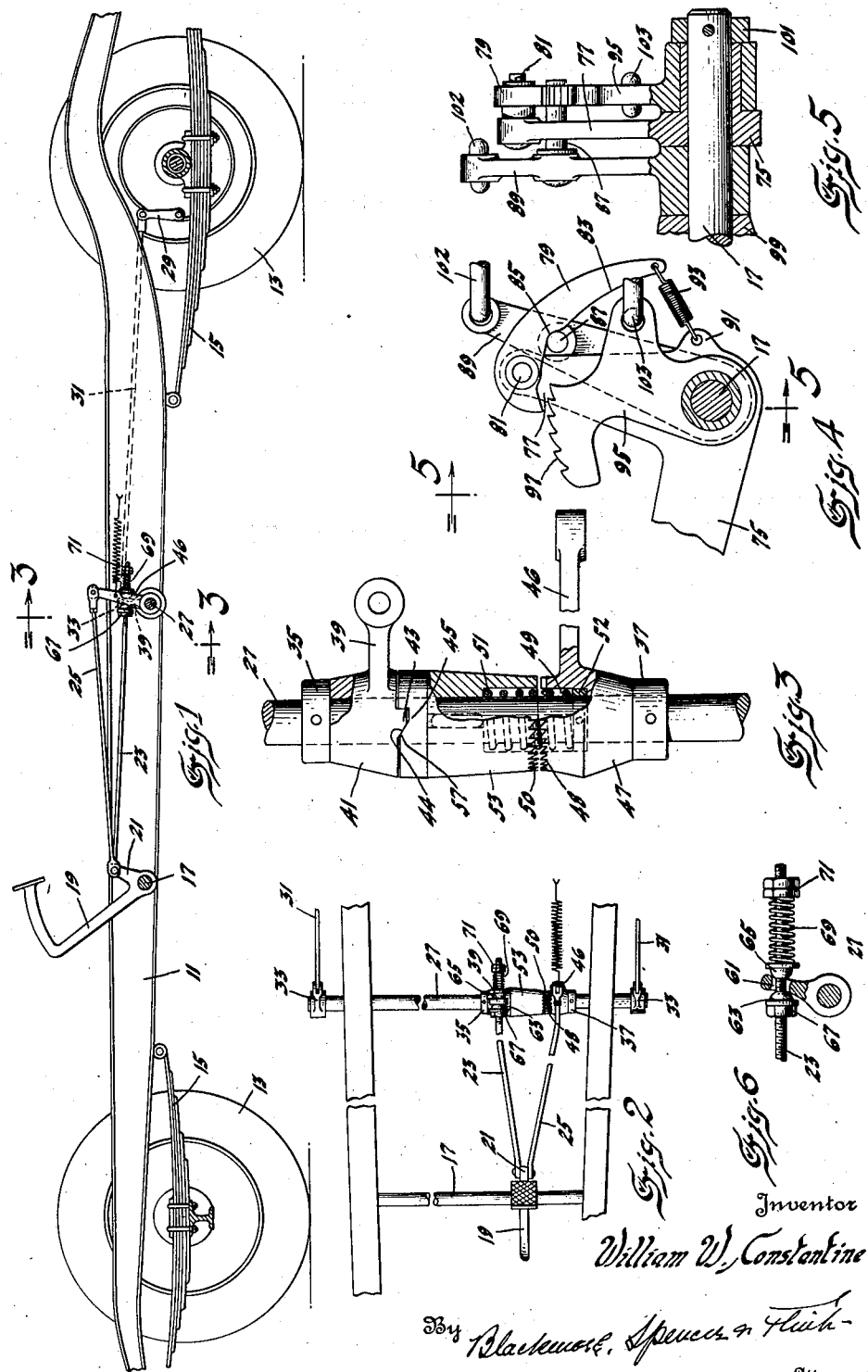

Inventor
William W. Constantine

By Blackmore, Spencer & Hulk
Attorney

Patented Mar. 24, 1931

1,797,329

UNITED STATES PATENT OFFICE

WILLIAM WINDLEY CONSTANTINE, OF LONDON, ENGLAND, ASSIGNOR TO GENERAL MOTORS CORPORATION, OF DETROIT, MICHIGAN, A CORPORATION OF DELAWARE

BRAKE-OPERATING MECHANISM

Application filed March 23, 1929. Serial No. 349,394.

This invention relates to brakes and has been designed more particularly as an improvement in the operating mechanism for brakes as used on motor vehicles.

An object of the invention is to provide an improved manually operated arrangement for applying vehicle brakes.

A further object is to provide such a mechanism with a two-stage action, the first stage operating with lesser and the second with a greater mechanical advantage.

As a further object the invention aims to make the shift from the first stage to the second stage dependent upon the condition of the brake or brakes, and not upon the position of the pedal.

Other objects and advantages will be understood from the following description.

The drawing accompanying this description shows several embodiments which the invention may assume.

Figure 1 is a view in side elevation of a portion of a vehicle chassis having my improved brake-applying device associated therewith.

Figure 2 is a top plan view of part of the chassis.

Figure 3 is an enlarged view of a portion of the mechanism, parts being in section, the view being from line 3—3 of Figure 1.

Figure 4 is a view in elevation of another form which the invention may assume.

Figure 5 is a section on line 5—5 of Figure 4.

Figure 6 is a view in side elevation, partly in section, of a detail.

Figure 7:
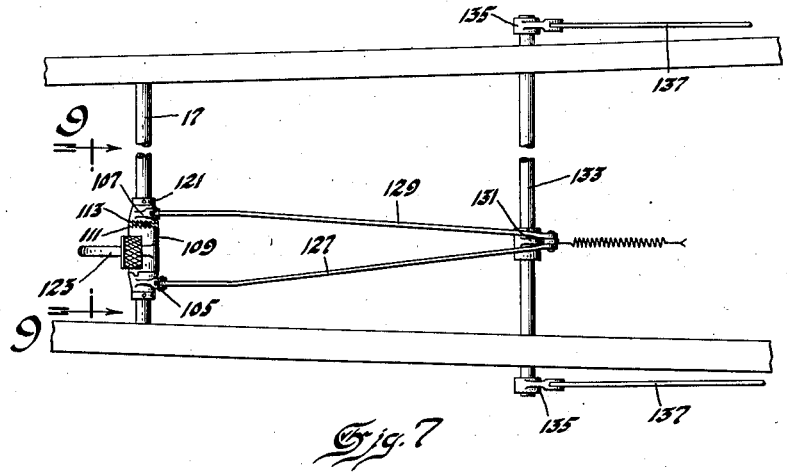
Figure 7 is a plan view of a portion of a vehicle chassis equipped with a third form which the invention may take.

Referring by reference characters to the drawing, and first to Figures 1, 2, 3 and 6, numeral 11 is used to designate one of the longitudinal frame bars of the vehicle chassis. This frame bar is to be supported by wheels 13 and springs 15 as usual.

At 17 is a cross shaft carried by the frame members 11 or by any convenient part of the chassis, the shaft 17 being intended to provide rotatable support for a pedal 19 or the equivalent thereof. As shown in the drawing the pedal has an arm 21 to which are connected two rods 23 and 25. At 27 is a brake rock shaft preferably carried by the frame members 11. From this shaft the rotary movement communicated to it by the pedal and rods 23 and 25, in a way to be more fully explained, is transmitted to the brake or brakes. There may be brakes on the rear wheels, brakes on all four wheels, or the brake system may include a transmission brake. The drawing shows an arm 29 at one of the rear wheels, the rocking of which is to apply the brake in the usual way. This arm and a corresponding one on the other rear wheel are connected by rods 31 to arms 33, on rock shaft 27. This illustration is sufficient to indicate one way in which the rocking of shaft 27 may function to apply the brakes.

Fixed to shaft 27 in spaced relation are collars 35 and 37. Adjacent collar 35 is a lever 39, hub 41 of which is freely rotatable on shaft 27. This hub has projections 43, one only being shown in Figure 3. One edge of the projection is inclined as at 44, the other being at right angles to the face of the hub. Between these two surfaces of projection 43 there is a surface 45 which, as shown, is substantially parallel to the edge of the hub.

Adjacent collar 37 is a second freely rotatable lever 46, this latter being of greater length than lever 39. The edge of the hub 47 of lever 46 remote from the collar 37 is formed with serrations 48. The hub 47 is also recessed as shown at 49 to receive a coil spring 51. Hub 47 is held axially positioned between collar 37 and an inner collar 52.

Between the hubs 41 and 47 is a sliding dog 53. This dog is mounted for sliding motion on shaft 27, but is non-rotatable relative to shaft 27, as shown in Figure 3. On the end of dog 53 adjacent hub 43 the dog is recessed as at 57, the recess shaped to fit the projection 43 on hub 41. At its other end the dog is provided with serrations 50 to cooperate with serrations 48, the serrations 48 and 50 being so cut that rotary movement of lever 46 may at times rotate dog 53 and shaft 27 in a brake-applying direction. The dog 53 is also recessed to receive the other end of spring 51. When dog 53 is moved axially by spring 51 the collar 52 prevents hub 47 from following the dog in its axial movement.

The rods 23 and 25 are to be connected to the ends of arms 39 and 46. Preferably the connection with short arm 39 includes a yielding connection as best shown in Figure 6. Here, as will be seen, the rod 23 passes through an opening 61 in the arm. There are abutments 63 and 65 on the rod on opposite sides of the arm. Abutment 63 is held by nut 67 and abutment 65 is slidably held by a spring 69, the latter seated against nuts 71 threaded to the rod 23 adjacent its end.

With an arrangement as above designated counter-clockwise rotation of the brake pedal pulls both rods 23 and 25 and turns both levers 39 and 46. Lever 46, being entirely disconnected from shaft 27, turns freely. Lever 39 engages dog 53 through the instrumentality of the inclined surface 44 and tends to rotate the dog, and with it shaft 27. Since, when the brakes are in released position, there is some degree of clearance, they offer little resistance to the rotation of dog 53 and shaft 27 by the lever 39 and the rotation of lever 39 actually turns the shaft 27 and takes up the clearance. Since this lever 39 is relatively short, a given linear movement of its end produces a considerable angular rotation of lever and shaft. The clearance is therefore taken up with a minimum pedal movement. When now the clearance is taken up further rotary movement of the short lever operates to slide the dog 53 axially against the compression of spring 51. This effects the engagement of ratchet teeth 48 and 50. Upon further movement of the short lever, its projecting surface 45 merely rides along the face of the dog. Further rotation of the long lever 36 operates through the engaged teeth 48 and 50 to rotate the dog 53 and shaft 27. Since arm 46 is relatively long, a given linear movement of its end is accompanied by a relatively small angular rotation of shaft 27. In the act of applying the brake through the instrumentality of lever 46, the pedal operates with higher mechanical advantage. Should there be any tendency for both levers to rotate dog 53 at one and the same time the yielding connection at 61 is present to render the device operative. In this way a lesser mechanical advantage and a small pedal movement are the operating conditions as long as there is clearance in the brakes or lost motion in the connecting rods. As the lost motion and clearance is taken up the pedal operates with a greater mechanical advantage while doing the real work of brake application. The change from the first stage to the second is dependent, not upon the position of the pedal as has been the case in some prior constructions, but is dependent upon the extent of clearance in the brakes and the lost motion in the brake linkage. But little pedal motion is required to take up this clearance and the mechanical advantage is then automatically changed to render the pedal action easy.

In Figures 4 and 5 is shown another form of the invention. Here shaft 17 is the shaft for the pedal 75. The pedal has an arm 77 to which is pivoted a pawl 79 by means of a pin 81. The pawl has a curved surface 83 struck on an arc having as its center the center of shaft 17, when pawl 79 is in engagement with teeth 97, as explained below. At the end of this curved surface is a depression 85 to receive a pin 87 carried by lever arm 89 rotatable on shaft 17 and located on that side of the pedal remote from the pawl 79. The pedal has a projection 91 to which is connected a spring 93, the spring also being connected to the extreme end of the pawl as shown. On the side of the pedal with the pawl is a short lever 95 provided with ratchet teeth 97. The teeth 97 cooperate with the teeth of the pawl, as shown in Figure 4. The engagement of the pawl with the teeth is effected by relative rotation between the pawl and the pedal against the tension of spring 93. This action is secured by a relative rotation between the pedal and the long lever 89 and through the instrumentality of pin 87. When the pawl is in engagement with the ratchet teeth the short lever is rotated to apply the brake. The pedal and the two levers are held in position on shaft 17 by any suitable means such as an abutment 99 and a collar 101. From the long and short levers extend the rods 102 and 103. These rods may be connected to operate the brake in any conventional manner. They may, for example, be connected to a lever arm on a rock shaft, which latter rock shaft is connected by brake rods to apply the brake, as shown, for example, in Figure 7.

In the operation of this second form of the invention, counter-clockwise rotation of the pedal, first rocks the long lever, spring 93 holding the pawl carried by the pedal against pin 87. During this first stage it will be understood that the resistance offered by the brake is less than the tension of spring 93. When this resistance at the brake becomes high, owing to the clearance being taken up, further movement of the pedal lever causes relative movement of pedal and the long lever whereupon the pin 87 causes the pawl 79 to rotate into engagement with teeth 97 on the short lever 95. Thereafter further rotation of the pedal operates through the short lever to apply the brake, the pin 87 travelling along the curved surface 83. Since during the first stage a given arc of pedal rotation causes a greater linear movement of the brake rod than occurs in the second stage, a relatively small pedal movement operates to take up brake clearance, after which the brake operates with a relatively high mechanical advantage in doing the work of brake application. The operation is therefore substantially as before and the shift from one stage to the other is made automatically just when the clearance is taken up and is not dependent upon any fixed position of the brake pedal. It will be noted that where as here the long and short levers are the operating members rather than operated upon, the long lever instead of the short lever is the one used during the first stage of the action.

Figure 8:
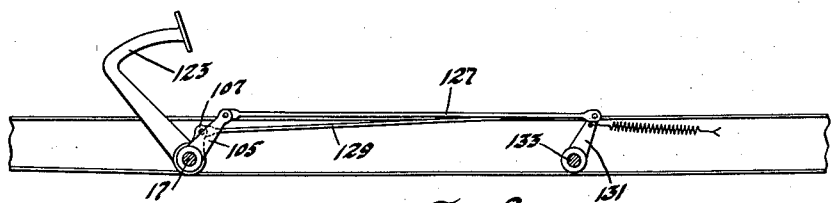
Figure 8 is a view in side elevation.
Figure 9:
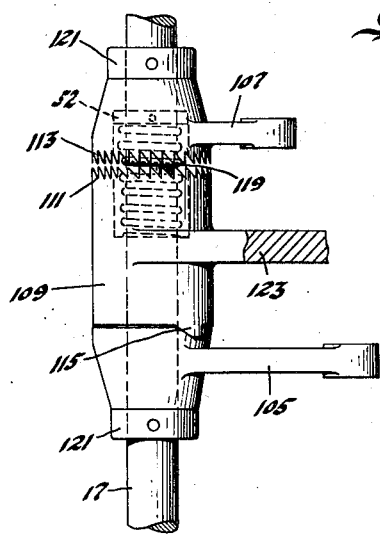
Figure 9 is a view from line 9—9 of Figure 7 of the operating mechanism used with this third form of the invention.

In Figures 7, 8 and 9, there is shown still another embodiment of the invention. In this case the long lever 105 and the short lever 107 are located on the pedal shaft 17. At 109 is the dog provided with ratchet teeth 111 to engage cooperating teeth 113 on the short lever. The dog also has a wedging projection 115 to engage a similarly shaped recess in the hub of the long lever. The sliding dog 109 is located between the levers and together with the short lever houses the spring 119. The parts are held in position by collars 121. In this form of the invention the dog is shown axially slidable and rotatable on axis 17. On the dog is an arm 123 which constitutes the pedal. The levers are connected by rods 127 and 129 to an arm 131 upstanding from a cross shaft 133 suitably journalled in the vehicle frame. This shaft 133 has terminal arms 135 which are connected by brake rods 137 to any conventional form of brakes.

In this form of the invention the operation is the same as before. The pedal rotates the dog 109. It first rotates the long lever 105 taking up the clearance in the brakes with minimum pedal travel. It then shifts transversely when the lost motion is taken up and the ratchet teeth 111 and 113 engage, whereupon the further movement of the pedal operates through the short arm 107 to apply the brakes. This later action will in an obvious way operate with a relatively high mechanical advantage.

Figure 10:
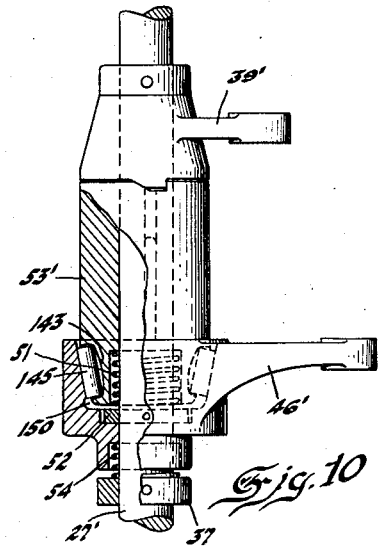
Figure 10 is a detail view of a further modification of the shifting mechanism, this form being shown as a substitute for the mechanism illustrated in Figure 3.

In Figure 10 is still another form which the invention may take. In this form shaft 27', short lever 39', long lever 46', corresponding in general to the shaft and levers of the form shown by Figure 3. It will be understood that the connections from the shaft 27' for applying the brakes and the connection from the levers back to the pedal will be the same as those shown in Figures 1 to 3. There is the same wedging arrangement between the hub of the short lever 39' and the axially slidable dog 53', this dog being keyed to the shaft as in Figure 3. Instead of the ratchet teeth acting to at times clutch the dog and long lever, there is shown an arrangement whereby the hub of the long lever is recessed as at 150 to receive the tapered extension 143 of the dog. The tapered end of the dog and the surrounding tapered recess of the long lever receive between them a series of rollers as at 145. The shape of the faces engaged by the rollers is such as to effect wedging of the dog and lever hub by but a slight axial movement of the dog toward the long lever. This type of clutch is of the kind known as the Humphrey-Sandberg and the drawing is intended to show such a clutch. In this form of the invention, a spring 51 is used to thrust part 53' axially as in the form shown by Figure 3. This spring acts against collar 52 as an abutment. The collar 52 functions also to prevent the hub of the lever 46' from following the dog 53' in its axial movement. The hub of lever 46' may have a little movement between collar 37 and collar 52, a spring 54 being used between the hub and collar 37. This spring is used to yield and permit a slight axial movement of the lever 46' in case the lift of the wedge when applying the brake should be more than sufficient to jam the roller clutch. The operation of this form of the invention is the same as before. It is a characteristic of this type of clutch that but a slight axial movement is required to effect clutch engagement. It should be explained that this invention is not restricted to the specific type mentioned, as other types of friction clutch may also be used.

But little lost motion takes place in shifting from one lever to the other. Still such lost motion may require wasteful pedal travel. Any construction to reduce lost motion at the time of shifting is to be desired. It is for that reason that this form of the invention may be found to be particularly desirable. It will be understood that this form of the invention may be employed in the relation shown by the Figure 9, it being merely necessary to reverse the arrangement of the levers and omit the key.

I claim:

1. In a brake for vehicles, a manually operable member, a cross shaft, a plurality of work-performing members journaled in spaced relation on said shaft, intermediate means slidably keyed to said shaft and constructed and arranged to at times yieldingly connect said manually operable member to one of said work-performing means and at other times to positively clutch said operable means to the other work-performing member.

2. In a motor vehicle, a manually operable member, a cross shaft, a plurality of work-performing members rotatable upon said shaft, mechanism connecting said manually operable member to said work-performing members, means between said work-performing members, non-rotatable relatively to said shaft and movable to two positions, in one position operable to engage and render active one of said work-performing members and in the other position to positively clutch and render active the other work-performing member, and yielding means normally holding said clutch disengaged.

3. Brake operating mechanism for motor vehicles including a manually operable member, a cross shaft, a plurality of brake operating means on said shaft, a connection between said manually operable member and each of said actuating means, a member between said actuating means, said member being non-rotatable on said shaft and slidable into driving engagement with either of said actuating means whereby in one position the brake is applied by one connection, and whereby in another position the brake is applied by another connection, the movement of said shiftable means being automatically determined by the clearance in the brake.

4. Brake operating mechanism comprising spaced levers having unequal arms, an axially shifting dog between said levers, cooperating inclined faces on one end of said dog and the hub of one of said levers, clutch mechanism for locking the dog to the other lever when the dog is axially moved toward said other lever.

5. The combination of claim 4, together with yieldable means to normally release said clutch connection.

6. The invention defined by claim 4, together with yieldable means to normally release said clutch connection, a manually operable lever and a plurality of connections from said manually operable lever to said long and short levers.

7. The invention defined by claim 4, together with yieldable means to normally release said clutch connection, a manually operable lever, a plurality of connections from said operable lever to said long and short levers, the inclined face engagement of the dog being with short lever, and means whereby the rotation of said dog may apply the brakes.

8. Brake operating mechanism comprising a shaft, a dog non-rotatably but slidably mounted thereon, levers rotatably mounted on said shaft adjacent said dog, cooperating inclined faces on the end of said dog and the end of one of said levers, clutch mechanism operable by the other end of said dog and the other lever.

9. The invention defined in claim 8, together with yielding means normally holding said clutch disconnected.

10. The invention defined by claim 8, together with yielding means normally holding said clutch disconnected, a manually operable means, connections from said manually operable means to each of said levers, and connections from said shaft to apply the brakes.

11. In a brake hook up for vehicles having a frame, a first mechanism comprising two unequally long levers with coaxial rotatable hubs, the axis of said lever hubs extending transversely of said frame, a second mechanism coaxially arranged between said lever hubs and slidable along its axis into driving engagement with the one or the other of said lever hubs, a manually operable member to rotate one of said mechanisms and means connected to the other of said mechanisms for performing work.

12. The invention defined by claim 11, one of said lever hubs and an adjacent part of said second mechanism having cooperating angular faces to effect said driving engagement, a spring to yieldingly hold said angular faces in contact, said spring adapted to yield upon a predetermined pressure between said angular faces, the sliding of said second mechanism thereupon effecting driving engagement with the other lever hub.

In testimony whereof I affix my signature.

WILLIAM WINDLEY CONSTANTINE.